Patented July 18, 1939

2,166,230

UNITED STATES PATENT OFFICE 2,166,230

TINTED PIGMENTS AND PROCESS FOR PRODUCING THE SAME

James E. Booge and Axel B. Laftman, Wilmington, Del., assignors to E. I. du Pont de Nemours & Company, Wilmington, Del., a corporation of Delaware No Drawing. Application February 18, 1937, Serial No. 126,385

15 Claims. (Cl. 134—78)

The present invention relates to composite pigments of a distinctive color or tint in which the pigment particles are formed of zinc sulfid coalesced with a colored compound of another metal, their method of manufacture and their uses in paints, enamels or other coating compositions.

In a particular embodiment of the invention the present improved pigments may be obtained by co-precipitating zinc sulfid with a small amount of another metal compound, such as a salt, oxide or sulfid, whereby composite particles of the two, or more, are produced, the phenomenon of such co-precipitation being frequently called coalescence. By this procedure one is enabled to produce tinted paints of controlled shade which heretofore have only been prepared by mechanically mixing the white zinc sulfid paint with colored pigments of dark shade or color. The paints made from the novel pigments of the present invention are particularly adapted to resist fading due to outside exposure.

It is old in the art to produce white zinc sulfid and to use this pigment in outside paints. Among the processes which have been described for making white zinc sulfid are the following: precipitation of zinc sulfid from zinc sulphate solution by the addition of sodium sulphide and precipitation of zinc sulfid from zinc chloride solution by the addition of barium sulphide liquor followed in each case by washing and calcination to produce a white zinc sulfid of satisfactory strength and color. Tinted paints for outside use have heretofore been made from the white zinc sulfid pigments by addition of a colored pigment as the tinting agent. For example, a white zinc sulfid pigment with the addition of an iron oxide pigment such as ochre produces a buff tint in the paint; similarly tinting with carbon black produces a gray tint, etc. It has been found, however, that such tinted zinc sulfid paint has shared the deficiency of other tinted paints heretofore available of fading on prolonged outside exposure.

This fading is due to chalking caused by disappearance of the oil binder through continuing oxidation. The disappearance of the oil binder leaves a film of pigment particles clinging to the surface of the paint. This film of pigment particles is surrounded by air, a medium of much lower refractive index than the original oil medium. Consequently, in accordance with known laws of optics, the hiding power of the white zinc sulfid is enormously increased in this surface film. The hiding power of the colored pigment particles does not increase in proportion so that the surface film becomes nearly white; this is known as fading of tinted paints on exposure.

Tests with a view to accurately determining the extent of this fading and the resistance which a given paint or enamel possesses thereagainst may be conducted through the medium of so-called and well-known accelerated weathering cabinets, wherein conditions approximating or equalling those prevailing in outside weather exposures and contacts may be duplicated.

We have now found, and the present invention provides, a simple and complete correction for overcoming this fading difficulty. It comprises the production of tinted, composite zinc sulfid pigments which make unnecessary the addition of a colored pigment to obtain the desired tint. Further, all particles of our tinted pigments possess substantially the same color. These tinted particles, even after chalking and in the form of a surface film surrounded by air, still retain their tint; the fact that the particles themselves are tinted makes impossible the formation of a nearly white film on the surface.

The tints most often used in outside paints are various shades of buff, yellow and cream, and various shades of gray. These are ordinarily produced in outside paints by the addition to white pigments of colored pigments such as ochre, chrome yellow, etc., in the requisite amount to produce the buff and yellow tints and the addition of carbon black or other black pigments in the requisite amount to produce the gray tint. Due to the popularity of these tints, our chief efforts have been directed towards the production of zinc sulfid of buff and gray tints, though other colors such as red and green, blue, etc., can also be produced.

We have found that zinc sulfid pigments can be tinted by the presence of controlled and small amounts of certain metallic compounds, and particularly metal sulfids. The compounds so employed are preferably formed and precipitated together with the zinc sulfid. Our explanation of their tinting effect is that the colored metallic compound is associated with the normally white zinc sulfid, possibly in the crystal lattice of the latter, in the form of a solid solution. Following common practice in the pigment art, we call such composite products "coalesced", and intend to embrace within the meaning of such term, here as well as in the appended claims, not only the aforesaid co-precipitation as such (including precipitation of the tinting pigment upon the zinc sulphide composition or vice versa), but co-calcination of the co-precipitates obtained, as well; and, in addition, co-calcination of blended, separately prepared pigment zinc sulfide and added metal compound, or, particularly, metal sulfide.

While broadly our invention is directed to the production of composite pigments of distinctive color or tint in which the pigment particles are formed of zinc sulfid coalesced with a colored compound of another and preferably heavy metal, we have found that colored sulfids, particularly those isomorphous with zinc sulfid, are most desirable and preferable for use herein since they produce tinted pigments of the greatest uniformity of individual particles. This leads us to believe that a solid solution of the colored sulfid in zinc sulfid is preferable, but we do not intend to limit ourselves to the use of sulfids isomorphous with zinc sulfid.

In making tinted zinc sulfid in accordance with our invention, we may use previously purified zinc chloride solution. To this solution is added a controlled amount of the predetermined metallic compound and the treated zinc chloride solution is then precipitated with barium sulfid liquor. The tinted zinc sulfid precipitate is then subjected to calcination preferably in a non-oxidizing atmosphere to improve its general pigment characteristics, i. e., lower oil absorption, etc., as well as tint. Similarly, in lieu of tinted zinc sulfid we may produce and utilize tinted extended zinc sulfid pigments by similar processes. Thus the use of treated zinc sulphate solution plus barium sulfid liquor yields barium base lithopone; treated zinc sulphate liquor plus calcium hydrosulfid solution yields calcium base lithopone; and, similarly, treated strontium base lithopones could also be produced. Accordingly, the invention is intended to apply to the production of normal lithopones, including pigments containing equimolecular quantities of co-precipitated zinc sulfid and barium sulfate in the instance of barium lithopones; and equimolecular quantities of zinc sulfid and calcium sulfate in the instance of calcium base lithopones.

We have found that the use of nickel salts as treating agents yield yellow and buff pigments; lead and molybdenum salts yield gray pigments. Numerous tints have been made by the addition of the appropriate metallic salts. Some examples are set out hereinafter in Table I. Other heavy metal salts can also be used to produce zinc sulfide pigments coalesced with the sulfide of the other metal. We can also produce zinc sulfid pigments coalesced with more than one other metal compound or sulfide. Furthermore, it has been found that the ultimate tints obtainable may be changed by and vary with different calcination temperatures. Accordingly, we contemplate a control over the ultimate tint obtainable in the zinc sulfid pigments of our invention by resorting to varying calcination temperatures and conditions, as will hereinafter appear.

Table I compares tinted zinc sulfides prepared from treated zinc chloride solutions, the amounts of added metal salt being given in terms of percentage of metallic sulfid based upon the total pigment; zinc sulfid plus added sulfid. The colors obtained are compared without calcination and after calcination at 400° C. and 700° C. It is to be understood, of course, that the calcination temperatures hereinafter referred to are not to be considered as limiting, since obviously a broad temperature range for calcination may be utilized, i. e., from 300° C. to 950° C., depending upon the degree desired and ultimate tint sought to be effected in the pigment.

Table I.—Tinted zinc sulfids

| Pigment | Uncalcined | 400° C. | 700° C. |
|---|---|---|---|
| 10% CuS | Light gray | Very dark gray | Light gray. |
| 10% Sb$_2$S$_3$ | Salmon pink | Buff | Reddish brown. |
| 10% CoS | Medium green | Medium green | Light green. |
| 10% NiS | Dark gray | Light gray | Light gray. |
| 10% PbS | Medium gray | Dark gray | Do. |
| .5% Ag$_2$S | | | Pearl gray. |
| 1% MoS$_2$ | | | Medium gray. |
| .75% NiS | Buff | | Greenish yellow. |
| .55% NiS | Grayish buff | | Buff. |

The variety of different tints possible and means of controlling the tints will be apparent from the above table.

It is also evident that the calcination temperature has a considerable effect upon the tint and the depth of the tint. This is illustrated further by the following additional examples:

Table II.—Calcination of pigment containing .5% NiS

|  | °C. |
|---|---|
| Yellowish green | 600 |
| Yellowish buff | 700 |
| Dark buff | 800 |
| Yellow | 850 |
| Yellow | 900 |

Table III.—Calcination of zinc sulfid containing 1% MoS$_2$

|  | °C. |
|---|---|
| Yellowish gray | 600 |
| Medium gray | 700 |
| Dark medium gray | 725 |

Altho the sulfids of many metals, in a wide range of concentrations, and calcined over a wide temperature range, may be used, we have developed certain preferred ranges to produce the most desirable tints. Thus, to produce a yellow tint we introduce nickel chloride in amounts equivalent to .55% to 0.75% NiS and calcine at 740 to 750° C. To produce a gray tint we introduce sodium molybdate in amounts equivalent to 0.84 to 1.67% MoS and calcine at 650–725° C. For red tints we prefer to add CrCl$_3$ equivalent to 10% CrS and calcine at 700–800° C.; for green, .55% to 10% CoS to CoCl$_2$ and calcine at 700–775° C.

These preferred ranges have been found to produce pigments of very pleasing tints. When the pigments are ground in a suitable vehicle and the resultant paint dried, the films are found to possess colors in the following ranges, graded according to the Munsell Color Scale: 5Y 8.7/7 to 5Y 7.5/7, N7.4 to N6.5; 10Y 6.5/3 to 10R–YR 3/7, 10G–YG 9/2 to 6GY 7/5 for yellow, gray, red and green tints, respectively. A still wider range may be secured by the use of other metallic sulfids, or by larger or smaller additions of the coloring agent, etc.

While we have specified metallic sulfids as particularly utilizable in the invention, it is to be understood their use is merely preferable because they are adapted to more advantageous employment in procuring our improved color tints. While the sulfids are preferable, it is contemplated that substantial but minor amounts of compounds other than the sulfids may be employed, particularly the salt or oxide compounds of iron, manganese, mercury, copper or cobalt. The latter compounds, however, and particularly those of iron, copper and cobalt, while utilizable, tend to induce off-color tints, and accordingly their use is not preferred. Such off-color tinting is particularly observable if these compounds are present in the pigmented product in an amount approximating less than substantially 1%. Accordingly, if such compounds are utilized, it is preferable that their amount range from, say, 1% to 20%, since somewhat better results are obtainable within this range.

Two tests were used to determine whether all the pigment particles had the same tint. One was by direct microscopic examination. By this test all the pigment particles possessed the same appearance; there was no indication of a mixture of white zinc sulfid with darker colored particles. The other test was a delicate method for determining "flooding" which results from the separation of pigment particles of different colors. A description of the test follows:

".5 gram of the pigment is mixed with .4 cc. of heavy bodied oil and mulled on a glass plate 150 times. .2 grams of the resulting paste is thoroughly mixed with .6 cc. of a 50 gal. limed-rosin China-wood linseed oil varnish containing 4 parts of China-wood oil to one of linseed oil. (This is an ordinary vehicle for use in flat wall paints.) The above mixture is dropped by means of a spatula into circles 1″ in diameter made by waxed pencil on a glass surface. The paint does not flow outside the waxed pencil circle. This paint 'button' is examined when dry for evidence of separation of its component colored particles. It has been found to be an extremely delicate test for the presence of pigment particles of different colors."

The pigments made by the procedures given in the following examples show homogeneity both by the microscopic test and by the flooding test.

*Example I.*—Purified zinc chloride solution of 20° Bé. is adjusted to .5 gram per liter zinc oxide content. To this zinc chloride solution is added enough nickel chloride solution to produce .55% nickel sulfid in the precipitated zinc sulfid. This solution is then precipitated by the addition of barium sulfid liquor of 20° Bé. The zinc chloride liquor and barium sulfid liquor are run simultaneously into the striking vessel while maintaining the hydrogen ion concentration at pH 9–9.6 and the temperature at 150–160° F. After the precipitation is complete, the slurry is adjusted to an end point corresponding to 4–6 cc. of N/10 iodine per 250 cc. of filtrate from the precipitate.

The raw pigment slurry is filtered and repulped three times with ten times its weight of water at 180° F. This will reduce the chloride content to .3% on the dry pigment. The raw pigment filter cake is finally dried to a moisture content of 10% and subsequently calcined at 775° C., wet ground, dried and dry ground.

*Physical tests on calcined pigment*

Color_____ Yellow
Flooding test_____ Negative
Light resistance_____ Satisfactory
Oil absorption_____ 13.0%
Reaction_____ 5 cc. N/50 acid per 2— g. pigment
Water soluble salts___ .03%
Moisture_____ .05%
Specific gravity_____ 4.15

*Example II.*—The same procedure was followed through the precipitation step of producing the tinted zinc sulfid as that described in Example I except that sufficient ammonium molybdate was added to produce 1.7% of $MoS_2$ in the composite pigment. After precipitation, however, the pH was adjusted to 3.5 with dilute hydrochloric acid due to the solubility of $MoS_2$ in alkaline solutions. The precipitate was filtered, washed, dried and calcined in the same way as under Example I. The calcination temperature in this case was 725° C.

Physical tests on the calcined pigment were as follows:

Color_____ Steel gray
Flooding test_____ Negative
Oil absorption_____ 11.9%
Reaction_____ 4.2 cc.
Water soluble salts_____ .11%
Moisture_____ .16
Specific gravity_____ 4.10

The preferred range of nickel sulfid is between .55% and 1% and for molybdenum sulfid is between .5% and 5% based on the tinted pigment.

In the utilization of these tinted zinc sulfid pigments in paint formulas, it is necessary or at least desirable to add other pigments and extenders, for improved durability characteristics against the normal types of paint failure. It is customary in paints to add extenders such as asbestine, silica, etc., partly for their bulking value and partly for the purpose of supplying large particles in the paint film. We have found, however, that the use of these white extenders with a tinted pigment tends to nullify, at least in part, the non-fading characteristics of the tinted pigment. We therefore prefer to employ colored extenders not heretofore used in tinted paints. After a careful survey of the field we have picked as our preferred colored extenders ground barytes produced from ore of the desired color. This tinted ground barytes is not normally useful as an extender and is available at a lower price than that of the white barytes. Colored extenders of the appropriate tint other than barytes can also be used. Examples are naturally colored, impure asbestine, silica, talc, ground slate, clays, etc.

The choice of the colored extender is made by blending the extender with the tinted zinc sulfid pigment in the dry state. This blend is then mixed with oil and the color in oil compared with the color in the dry state. A minimum difference in color indicates that the fading due to chalking will be at a minimum. This combination of tinted zinc sulfid pigments with colored extender is entirely novel and solves a long standing problem in the formulation of outside paints.

As another modifying pigment in the paint formula, we have found it desirable to use leaded zinc oxide. The type known as 35% leaded zinc is preferable but any leaded zinc oxide is satisfactory from the standpoint of durability and non-chalking characteristics. It will be noted that the leaded zinc oxide has the property of retarding chalking in the paint film and has in itself only a minimum tendency to form a white chalk which clings to the surface. Consequently, it is the best modifying pigment to use with the tinted zinc sulfid with or without colored extender. These ingredients can be mixed into the paint composition together with the tinted, composite zinc sulfid at the time of preparing the paints.

We prefer in some cases to prepare the pigment mixture prior to use in outside paint. Such pigment mixtures may contain tinted zinc sulfid and colored extender chosen by the method previously described to yield the minimum difference between the wet and dry color; the mixture may consist of tinted zinc sulfid plus 35% leaded zinc or finally (and preferably) of all three components, tinted zinc sulfid, colored extender and leaded zinc oxide.

The preferred proportions of the two component mixtures are as follows:

|  | Range | Preferred |
| --- | --- | --- |
| Tinted zinc sulphid; colored extender. | 10% to 50% ZnS | 25% ZnS. |
| Tinted zinc sulphid; leaded zinc oxide. | 85% to 35% ZnS | 60% ZnS. |
| Tinted zinc sulphid; colored extender, leaded zinc oxide. |  |  |

When all three components are present the percentage of tinted zinc sulfid may run from 5% to 50%, the leaded zinc oxide from 75% down to 25%, the colored extender making up the remainder. The preferred proportions are 12 parts tinted zinc sulphid, 43 parts colored extender and 45 parts 35% leaded zinc oxide.

The blends described above can be used in outside house paints. The preferred vehicle is linseed oil (raw oil or refined), with 8% of heavy bodied linseed oil to produce flow and hardness of film. We do not limit ourselves, however, to linseed oil vehicles as our tinted pigments are equally valuable in other vehicles including synthetic resins, varnishes of the modified phenol-formaldehyde type, also in China-wood oil vehicles, as well as in the usual varnish vehicles. In addition to their use in paints, our tinted pigments may also be employed in ceramics, such as colored glazes and enamels, etc. Paints and enamels containing such pigment combinations have been found to yield durability results with respect to fading resistance not heretofore obtainable. In determining these improved durability results, we have conducted extensive tests on the paints described herein, subjecting them to prolonged exposure in accelerated weathering cabinets of the type hereinabove referred to, and found them to be uniformly more durable as regards fading and chalking. For example, at the end of one week's exposure it was found that all of fifteen paste films containing white ZnS and orthodox tinting materials were badly faded, while four films containing the invention described herein showed little or no fading. These tests show that the pigments and paints described herein have the property of weathering to a color closely approximating that of the unweathered paint film.

We claim as our invention:

1. A calcined pigment tinted to a distinct color comprising zinc sulfid coalesced with from 0.55 to 1% of nickel sulfid.

2. A calcined pigment tinted to a distinct color comprising zinc sulfid coalesced with from 0.5 to 5% molybdenum sulfid.

3. A calcined pigment tinted to a distinct color comprising zinc sulfid and a minor amount of a colored metal sulfid whose metal component forms more than one oxide, said metal being from the group consisting of manganese, mercury, chromium, copper, antimony, cobalt, nickel, lead, silver and molybdenum, said colored metal sulfid being present in the individual particles of said zinc sulfid.

4. A calcined, composite pigment, the individual particles of which consist of zinc sulfid as the predominant constituent and another, colored metal sulfid whose metal component forms more than one oxide, said metal being from the group consisting of manganese, mercury, chromium, copper, antimony, cobalt, nickel, lead, silver and molybdenum, in an amount sufficient to impart a distinctive color to the pigment particles.

5. A calcined pigment tinted to a distinct color comprising zinc sulfid coalesced with from about 0.5 to 20% of a colored metal sulfid whose metal component forms more than one oxide, said metal being from the group consisting of manganese, mercury, chromium, copper, antimony, cobalt, nickel, lead, silver and molybdenum.

6. A calcined pigment tinted to a distinct color comprising zinc sulfid coalesced with a minor amount of a colored metal sulfid whose metal component forms more than one oxide, said metal being from the group consisting of manganese, mercury, chromium, copper, antimony, cobalt, nickel, lead, silver and molybdenum, and mixed with a colored extender.

7. A calcined pigment tinted to a distinct color comprising zinc sulfid coalesced with a minor amount of a colored metal sulfid whose metal component forms more than one oxide, said metal being from the group consisting of manganese, mercury, chromium, copper, antimony, cobalt, nickel, lead, silver and molybdenum, and mixed with leaded zinc oxide.

8. A calcined pigment tinted to a distinct color comprising zinc sulfid coalesced with a minor amount of a colored metal sulfid whose metal component forms more than one oxide, said metal being from the group consisting of manganese, mercury, chromium, copper, antimony, cobalt, nickel, lead, silver and molybdenum, and mixed with leaded zinc oxide and a colored extender.

9. In a process of producing a pigment tinted to a distinct color the steps of co-precipitating zinc sulfid and a smaller amount of a colored metal sulfid whose metal component will form more than one oxide, said metal being from the group consisting of manganese, mercury, chromium, copper, antimony, cobalt, nickel, lead, silver and molybdenum, said amount being sufficient to impart to the pigment a distinctive color, and calcining said co-precipitate.

10. In a process of producing a pigment tinted to a distinct color the step of co-precipitating zinc sulfid and from about 0.5 to 20% of a colored metal sulfid whose metal component forms more than one oxide, said metal being from the group consisting of manganese, mercury, chromium, copper, antimony, cobalt, nickel, lead, silver and molybdenum and calcining said co-precipitate.

11. In a process of producing a pigment tinted to a distinct color the steps of co-precipitating zinc sulfid and from about 0.5 to 20% of a colored metal sulfid, the metal component of which forms more than one oxide, said metal being from the group consisting of manganese, mercury, chromium, copper, antimony, cobalt, nickel, lead, silver and molybdenum, and calcining said co-precipitate.

12. In a process of producing a pigment tinted to a distinct color the steps of adding a water-soluble sulfid to an aqueous solution containing a zinc salt and a smaller amount of a salt of another heavy metal capable of forming a colored sulfid and more than one oxide, said metal being from the group consisting of manganese, mercury, chromium, copper, antimony, cobalt, nickel, lead, silver and molybdenum, and recovering and calcining the precipitate formed, the amount of said other heavy metal salt being sufficient to form with the zinc sulfid a coalesced precipitate of a distinctive color.

13. In a process of producing a pigment tinted to a distinct color the steps of adding a water-soluble sulfid to an aqueous solution containing a zinc salt and a smaller amount of a salt of another heavy metal capable of forming a colored sulfid, and more than one oxide, said metal being from the group consisting of manganese, mercury, chromium, copper, antimony, cobalt, nickel, lead, silver and molybdenum, and recovering and calcining the precipitate formed, the amount of said other heavy metal salt being sufficient to form from 0.5 to 20% of a sulfid, based on the total weight of the pigment.

14. A calcined pigment tinted to a distinct color comprising zinc sulfid and from about 0.5 to 10% of a colored metal sulfid whose metal component forms more than one oxide, said metal being from the group consisting of manganese, mercury, chromium, copper, antimony, cobalt, nickel, lead, silver and molybdenum.

15. A calcined pigment tinted to a distinct color, comprising zinc sulfid coalesced with about 10% of chromium sulfid.

JAMES E. BOOGE.
AXEL B. LAFTMAN.